(12) United States Patent  
Jelinek

(10) Patent No.: US 8,971,287 B2  
(45) Date of Patent: Mar. 3, 2015

(54) METHOD FOR WIRELESS COMMUNICATION BETWEEN A MOTOR VEHICLE AND AT LEAST ONE OTHER COMMUNICATION PARTNER AND MOTOR VEHICLE

(75) Inventor: Karl Jelinek, Koesching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/992,926

(22) PCT Filed: Sep. 29, 2011

(86) PCT No.: PCT/EP2011/004856  
§ 371 (c)(1),  
(2), (4) Date: Jun. 10, 2013

(87) PCT Pub. No.: WO2012/076067  
PCT Pub. Date: Jun. 14, 2012

(65) Prior Publication Data  
US 2013/0265983 A1    Oct. 10, 2013

(30) Foreign Application Priority Data  
Dec. 10, 2010   (DE) .......................... 10 2010 054 087

(51) Int. Cl.  
*H04W 4/00* (2009.01)  
*H04J 3/26* (2006.01)  
*H04J 4/00* (2006.01)

(52) U.S. Cl.  
USPC ............................ 370/330; 370/432; 370/436

(58) Field of Classification Search  
CPC . H04W 28/04; H04W 72/04; H04W 72/0446; H04L 5/0007; H04L 29/06; H04L 12/2801; H04L 12/185; H04L 45/16; H04J 4/00  
USPC .......................... 370/329, 330, 431, 432, 436  
See application file for complete search history.

(56) References Cited

U.S. PATENT DOCUMENTS

| | | | |
|---|---|---|---|
| 3,714,573 A * | 1/1973 | Grossman | 342/387 |
| 4,818,998 A * | 4/1989 | Apsell et al. | 342/444 |
| 5,095,531 A * | 3/1992 | Ito | 455/435.3 |
| 6,130,626 A | 10/2000 | Kane et al. | |
| 6,396,917 B1 * | 5/2002 | Brush et al. | 379/201.12 |
| 6,970,092 B2 * | 11/2005 | Hum et al. | 340/573.4 |

(Continued)

FOREIGN PATENT DOCUMENTS

| | | |
|---|---|---|
| DE | 10054180 | 5/2002 |
| DE | 102008007711 | 8/2009 |

(Continued)

OTHER PUBLICATIONS

English language copy of International Search Report for PCT/EP2011/004856, mailed on Dec. 20, 2011, 2 pages.

(Continued)

*Primary Examiner* — Ronald Abelson  
(74) *Attorney, Agent, or Firm* — Staas & Halsey LLP

(57) ABSTRACT

A method performs wireless communication between a motor vehicle and at least one other communication partner, especially a further motor vehicle and/or a stationary communication partner. A predetermined transmission frequency is used via which the motor vehicle and/or the communication partner transmit a communication-partner-specific identification signal cyclically between transmission breaks.

16 Claims, 2 Drawing Sheets

(56) References Cited

U.S. PATENT DOCUMENTS

| | | | |
|---|---|---|---|
| 7,315,897 B1* | 1/2008 | Hardee et al. | 709/229 |
| 2001/0014607 A1* | 8/2001 | Furukawa et al. | 455/436 |
| 2001/0037298 A1* | 11/2001 | Ehrman et al. | 705/40 |
| 2002/0123672 A1* | 9/2002 | Christophersom et al. | 600/300 |
| 2003/0224824 A1* | 12/2003 | Hanson | 455/560 |
| 2004/0128062 A1* | 7/2004 | Ogino et al. | 701/200 |
| 2004/0133716 A1* | 7/2004 | Lee | 710/72 |
| 2005/0093679 A1* | 5/2005 | Zai et al. | 340/10.2 |
| 2007/0075836 A1* | 4/2007 | Lieffort et al. | 340/10.1 |
| 2007/0081501 A1* | 4/2007 | Ushirokawa et al. | 370/335 |
| 2008/0031208 A1 | 2/2008 | Abhishek et al. | |
| 2009/0093290 A1* | 4/2009 | Lutnick et al. | 463/16 |
| 2009/0313370 A1* | 12/2009 | Rhoads | 709/224 |
| 2010/0178872 A1 | 7/2010 | Alrabady et al. | |
| 2011/0261794 A1* | 10/2011 | Le Neel | 370/338 |

FOREIGN PATENT DOCUMENTS

| | | |
|---|---|---|
| DE | 102010054087 | 12/2010 |
| EP | 2101305 | 9/2009 |
| EP | 2011/004856 | 9/2011 |

OTHER PUBLICATIONS

German Office Action dated Oct. 25, 2013 in German Patent Application No. 102010054087.0.

Ryotaro Fukui et al., "Individual Communication Function of RACS: Road Automobile Communication System", IEEE, 1989, pp. 206-213.

* cited by examiner

METHOD FOR WIRELESS COMMUNICATION BETWEEN A MOTOR VEHICLE AND AT LEAST ONE OTHER COMMUNICATION PARTNER AND MOTOR VEHICLE

CROSS REFERENCE TO RELATED APPLICATIONS

This application is based on and hereby claims priority to International Application No. PCT/EP2011/004856 filed on Sep. 29, 2011 and German Application No. 10 2010 054 087.0 filed on Dec. 10, 2010, the contents of which are hereby incorporated by reference.

BACKGROUND

The invention relates to a method for wireless communication between a motor vehicle and at least one other communication partner, especially a further motor vehicle and/or a stationary communication partner. In addition, the invention relates to a motor vehicle.

To provide for the exchange of information with other traffic users or also stationary objects during the operation of a motor vehicle, so-called "Car-to-X" systems have been proposed, that is to say radio-based communication systems via which the motor vehicle can communicate with other communication partners, especially further motor vehicles and/or stationary communication partners. In this context it is presently known that in the correspondingly equipped motor vehicles, communication devices are provided which continuously search for possible other communication partners, for example, vehicles, traffic installations, gas stations, traffic lights and the like outside the motor vehicle. The aim is to set up a data link with a compatible communication device. In this context, various frequency bands are checked continuously in a scanning process. In order to detect potential communication partners as early as possible, the range, and thus the output power, of the radio antenna must be very high.

These continuously high radio powers have the consequence of an increased consumption of the on-board electrical system in the motor vehicle. In current motor vehicles having internal combustion engines, this leads to a mandatorily increased fuel consumption; in electrically operated motor vehicles, this results in a reduction of the possible driving range.

Most of the methods for detecting a communication partner suitable for the exchange of information are here based on the question/response method which requires repeated transmission at the different frequencies or frequency bands which, in turn, results in the increased energy consumption.

SUMMARY

One possible object is specifying an option for finding communication partners which manages with a lower energy consumption.

The inventor proposes a method for wireless communication between a motor vehicle and at least one other communication partner, especially a further motor vehicle and/or a stationary communication partner. According to the proposed method, a predetermined transmission frequency is used via which the motor vehicle and/or the communication partner transmit a communication-partner-specific identification signal cyclically between transmission breaks.

The inventor proposes to use identification signals as radio signals which are transmitted on a fixed transmission frequency. In this context, it can be provided that the identification signal is implemented by an identification pattern of the radio-based communication device used by the motor vehicle, an unambiguous identification signal specific to this communication device (and thus to the transmitting communication partner) being issued to each radio-based communication device. Possible communication partners can be detected unambiguously and early by evaluation of received identification signals, the electrical power consumption during the "search" for new connections being additionally reduced by the gapped operation. Thus it is not necessary to look continuously for compatible radio partners with full transmission power but it is possible to save electrical energy in the motor vehicle.

The method is particularly advantageous when a transmission break is used which is longer than the transmission time for the identification signal. For example, it can be provided that a transmission break within a range of seconds is used, for example, 5 seconds, the transmission time for the identification signal being less than one second, for example, within the range of 100 ms or 100 µs. During the transmission break, the transmission frequency is simultaneously monitored, ideally continuously, for identification signals of other communication partners which can then be evaluated. The smaller the ratio between transmission time and transmission break, the lower the probability that identification signals overlap within the transmission range, so that, for example, no filter arrangement or the like is needed for separating different identification signals.

In an advantageous further embodiment, it can be provided that at least one information item is coded into the identification signal, especially the type of the communication partner and/or a type of the communication partner and/or an availability with respect to a selective communication with the communication partner and/or a status of the communication partner. In particular, a defined radio protocol can be used via which the identification signals on the transmission frequency can be evaluated by all communication partners after reception. Thus, it is possible in a simple manner to select on the basis of certain conditions, communication partners with which an actual data exchange is then carried out. It is possible to distinguish via the type of the transmitter, for example, mobile and stationary communication partners, especially also in finer resolution, for example in accordance with the type of the traffic user and/or type of the stationary communication partner. A type of the transmitter can be in the case of a motor vehicle, for example, a manufacturer and information relating to the model wherein an availability information item with respect to a selective communication with the transmitter can comprise information relating to communication frequencies and protocols used there. A status of the transmitter can provide, for example, information about the activity of the communication partner and the like.

As already mentioned, it can be provided that at least one identification signal is received and evaluated by the motor vehicle, especially with regard to a possible selective communication with the communication partner transmitting the identification signal. It can be provided, in particular, that the predetermined transmission frequency is monitored for identification signals of other communication partners at least during the entire transmission break. Overlapping identification signals of two different communication partners can be resolved, for example, by filters.

If a communication partner is found, it can be provided that a selected communication with a communication partner takes place at a frequency different from the transmission frequency. This means that the predetermined transmission frequency is ultimately kept available for the identification and search operation so that the communication between communication partners cannot disturb the identification signals. In particular, the frequency at which the communication takes place can be determined from an information item contained in the identification signals about an availability with respect to a selective communication with the communication partner.

Preferably, it can also be provided that an extended selective communication takes place with a communication partner identified as having the same manufacturer and/or the same type. The method thus also provides for a "friend" type detection (especially an OEM detection), so that an extended data exchange can take place in the case of special correspondence of information transmitted via the identification signal, for example additional information can be requested from the communication partner and/or other functions can be used.

As transmission range for the identification signal, it is possible to use 10 to 30 meters, especially 20 meters. Such a rather short communication range also reduces the risk of overlapping identification signals and can be used especially in communication systems in which an information exchange can, in case of doubt, also take place via a number of communication partners, at least a part of the communication partners therefore being constructed as routers. Thus, for example, in a traffic jam, an information item can be transported from the beginning of the traffic jam to the end of the traffic jam via a number of communication partners, especially motor vehicles which can in each case recognize each other by the identification signal.

Apart from the method, the inventor also proposes a motor vehicle, comprising a communication device constructed for performing the proposed method. This means that the communication device of the motor vehicle has corresponding software and hardware components which, on the one hand, enable the identification signal to be transmitted at the predetermined transmission frequency and, on the other hand, identification signals of other communication partners to be received and evaluated with respect to a possible selective communication.

By a corresponding embodiment of motor vehicles and other communication partners, all of whom have a communication device constructed for performing the proposed method, a communication system can be created which can be operated with a low energy consumption overall and still allows suitable communication partners to be found among the communication partners.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
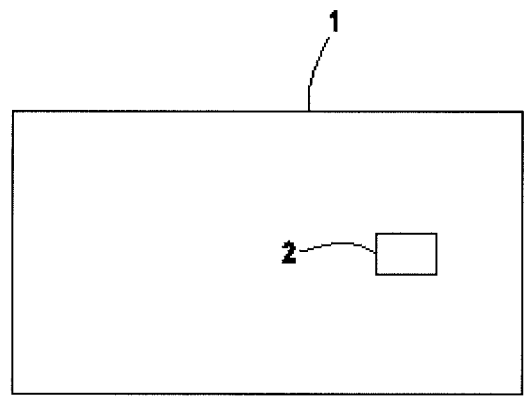
FIG. 1 shows a motor vehicle according to one embodiment of the inventor's proposals.

Reference will now be made in detail to the preferred embodiments of the present invention, examples of which are illustrated in the accompanying drawings, wherein like reference numerals refer to like elements throughout.

FIG. 1 shows a potential proposed motor vehicle 1 in a basic diagram. In the motor vehicle 1, a communication device 2 is installed. This then has two basic functionalities. On the one hand, it transmits cyclically in gapped operation, an identification signal which is specific for the communication device 2 and thus for the motor vehicle 1. This identification signal is transmitted at a predetermined transmission frequency. At the same time, the communication device 2 is constructed for monitoring this transmission frequency at least in the transmission breaks, in order to receive and evaluate the identification signals of other communication partners, especially in order to determine whether a selective communication with the communication partner belonging to the identification signal is meaningful.

For this purpose, the identification signal is designed, for example, in the manner of a particular protocol, in such a way that it contains various information items which identify the type of the communication partner, that is to say whether it is a traffic user, and, if so, what type of traffic user, or a stationary communication partner, for example, a traffic light, a gas station or the like. In addition, the type of the communication partner is coded in the information signal, that is to say, for example, manufacturer and model in the case of a motor vehicle. Finally, the identification signal also contains a status and an information item on the availability with respect to a selective communication with the communication partner.

On the basis of this information, which can be obtained by evaluation from the identification signal it is lastly possible to conclude whether a selective communication with the communication partner transmitting the identification signal is worthwhile.

Figure 2:
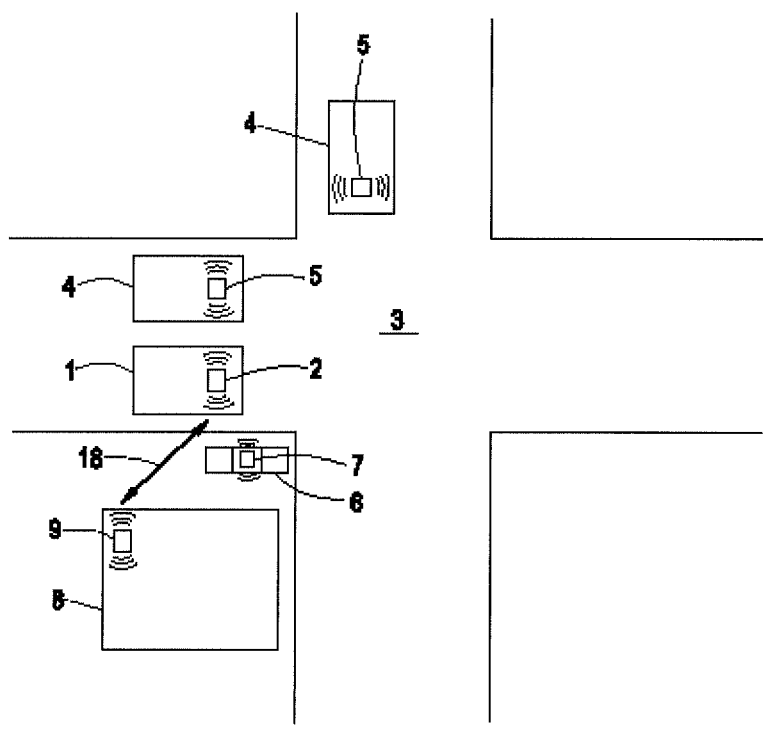
FIG. 2 shows the motor vehicle of FIG. 1 as partner of a communication system.
Figure 3:
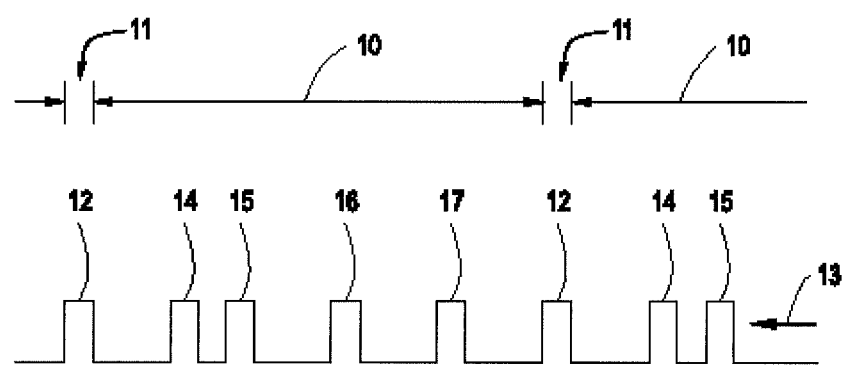
FIG. 3 shows a timing diagram of the sequence of various identification signals.

FIG. 2, in which the motor vehicle 1 with the communication device 2 is shown at an intersection 3, illustrates a communication system containing the motor vehicle 1 as communication partner. As indicated, it transmits its identification signal regularly. Two further motor vehicles 4 with communication devices 5 and two stationary communication partners, namely a traffic light 6 with a communication device 7 and a gas station 8 with a communication device 9 are shown as further communication partners. The further communication devices 5, 7 and 9 also transmit regularly in gapped mode their identification signal at the predetermined transmission frequency which will be explained in greater detail by FIG. 3.

The activity of the communication device 2 of the motor vehicle 1 is shown in greater detail there in the upper area. Between transmission breaks 10, the transmission times 11, are located in which the identification signal 12 of the motor vehicle 1 is transmitted. The transmission breaks 10 are clearly much longer than the transmission time 11, the transmission break 10 being able to last for example 5 seconds and the transmission time 11 for example 100 µs. It can be seen that at the transmission frequency 13 shown diagrammatically in the lower area, apart from the identification signals 12 of the motor vehicle 1, other identification signals 14 to 17 are present, which are transmitted by the other communication partners 4, 6, and 8. Correspondingly, they are also received by the motor vehicle 1 or the communication device 2, respectively, and can be evaluated there. On the basis of the information contained in the identification signals 14 to 17, the motor vehicle 1 can decide whether it would like to set up a selective communication with one of the other communication partners 4, 6 or 8. Correspondingly, the communication devices 5, 7 and 9 naturally also evaluate the identification signals not transmitted by themselves, including also the identification signal 12 of the motor vehicle 1. They, too, can set up selective communication links to other communication partners, for example the motor vehicle 1, if necessary.

In the present case, the motor vehicle 1 would like to set up a selective communication link 18 (FIG. 2) with the gas station 8, and therefore the communication device 9. For this purpose, it utilizes the information contained in the identification signal 17 for the gas station 8 about the availability of the gas station 8, so that the selective communication 18 with the gas station 8 takes place at a frequency different from the transmission frequency.

At this point it should also be noted that it is possible to determine, via the information contained in the identification signals 12, 14 to 17, and the evaluation, also communication partners which provide for an extended communication, ultimately, therefore, an extended data exchange, that is to say a so-called "friend detection". For example, motor vehicles 1, 4, from the same manufacturer can transmit additional information or additional functionalities can be used in the "Car-to-X communication system" described.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for wireless communication between a motor vehicle and communication partners including at least one of other motor vehicles and stationary communication partners, the method comprising:
   coding an information item in a communication-partner-specific identification signal;
   transmitting, by the motor vehicle, the identification signal to the communication partners using a predetermined transmission frequency, the identification signal being transmitted cyclically during transmission times;
   receiving, at the motor vehicle, identification signals from the communication partners, the identification signals being received on the predetermined transmission frequency during transmission breaks;
   evaluating the identification signals received at the motor vehicle for finding suitable communication partners with regard to a possible selective communication with a selected communication partner transmitting one of the identification signals received, the identification signals being evaluated taking into consideration the information item; and
   using a frequency different from the predetermined transmission frequency for the selective communication with the selected communication partner,
   wherein
   the identification signal is coded with information specifying if the communication partner is a traffic light or a gas station.

2. The method as claimed in claim 1, wherein the transmission breaks are longer than the transmission times.

3. The method as claimed in claim 1, wherein the identification signal is transmitted with a transmission range of 10 to 30 meters.

4. The method as claimed in claim 1, wherein the communication partners also evaluate received identification signals for finding suitable communication partners with regard to a possible selective communication.

5. The method as claimed in claim 1, wherein the receiving comprises receiving, at the motor vehicle, a plurality of identification signals from different communication partners during a single transmission break, the plurality of identification signals being received on the predetermined transmission frequency.

6. The method as claimed in claim 1, wherein
   the transmission breaks are set for a predetermined amount of time during which identification signals are received on the predetermined transmission frequency by the motor vehicle.

7. A method for wireless communication between a motor vehicle and communication partners including at least one of other motor vehicles and stationary communication partners, the method comprising:
   coding an information item in a communication-partner-specific identification signal;
   transmitting, by the motor vehicle, the identification signal to the communication partners using a predetermined transmission frequency, the identification signal being transmitted cyclically during transmission times;
   receiving, at the motor vehicle, identification signals from the communication partners, the identification signals being received during transmission breaks;
   evaluating the identification signals received at the motor vehicle for finding suitable communication partners with regard to a possible selective communication with a selected communication partner transmitting one of the identification signals received, the identification signals being evaluated taking into consideration the information item; and
   using a frequency different from the predetermined transmission frequency for the selective communication with the selected communication partner,
   wherein
   an extended selective communication takes place with a communication partner identified as having the same manufacturer and/or the same type.

8. A motor vehicle to wirelessly communicate with communication partners including at least one of other motor vehicles and stationary communication partners, the motor vehicle comprising:
   a communication device comprising:
      a computing device to code an information item in a communication-partner-specific identification signal;
      a transmitter to transmit the identification signal to the communication partners using a predetermined transmission frequency, the identification signal being transmitted cyclically during transmission times; and
      a receiver to receive identification signals from the communication partners, the identification signals being received on the predetermined transmission frequency during transmission breaks, wherein
      the identification signals received at the motor vehicle are evaluated for finding suitable communication partners with regard to a possible selective communication with a selected communication partner transmitting one of the identification signals received, the identification signals being evaluated taking into consideration the information item, and
      a frequency different from the predetermined transmission frequency is used for the selective communication with the selected communication partner,
      wherein
      an extended selective communication takes place with a communication partner identified as having the same manufacturer and/or the same type.

9. The motor vehicle as claimed in claim 8, wherein
the transmission times during which the transmitter transmits the identification signal to the communication partners have a duration of $N_1$ seconds, and the transmission breaks during which the receiver receives identification signals from the communication partners have a duration of $N_2$ seconds, where $N_2$ is greater than $N_1$, and
the transmitter transmits the identification signal every $(N_1+N_2)$ seconds.

10. A method for wireless communication between a motor vehicle and communication partners including at least one of other motor vehicles and stationary communication partners, the method comprising:
coding an information item in a communication-partner-specific identification signal;
transmitting, by the motor vehicle, the identification signal to the communication partners using a predetermined transmission frequency, the identification signal being transmitted cyclically during transmission times;
receiving, at the motor vehicle, identification signals from the communication partners, the identification signals being received on the predetermined transmission frequency during transmission breaks;
evaluating the identification signals received at the motor vehicle for finding suitable communication partners with regard to a possible selective communication with a selected communication partner transmitting one of the identification signals received, the identification signals being evaluated taking into consideration the information item; and
using a frequency different from the predetermined transmission frequency for the selective communication with the selected communication partner,
wherein the receiving further comprises:
receiving, at the motor vehicle, a plurality of identification signals from different communication partners during a single transmission break, the plurality of identification signals being received on the predetermined transmission frequency, and performing filtering to resolve overlapping identification signals received during the single transmission break from the different communication partners.

11. The method as claimed in claim 10, wherein
the identification signal is coded with at least one parameter selected from the group consisting of type of communication partner, availability of communication partner with respect to selective communication, and status of communication partner.

12. The method as claimed in claim 10, wherein
the identification signal is coded with information specifying whether the communication partner is another motor vehicle or a stationary communication partner.

13. The method as claimed in claim 10, wherein
the identification signal is coded with information specifying if the communication partner is a traffic light or a gas station.

14. The method as claimed in claim 10, wherein
the identification signal is coded with information identifying manufacturer and model of the communication partner.

15. The method as claimed in claim 10, wherein
the identification signal is coded with information specifying if the communication partner is available for selective communication.

16. A motor vehicle to wirelessly communicate with communication partners including at least one of other motor vehicles and stationary communication partners, the motor vehicle comprising:
a communication device comprising:
a computing device to code an information item in a communication-partner-specific identification signal;
a transmitter to transmit the identification signal to the communication partners using a predetermined transmission frequency, the identification signal being transmitted cyclically during transmission times; and
a receiver to receive identification signals from the communication partners, the identification signals being received on the predetermined transmission frequency during transmission breaks, wherein
the identification signals received at the motor vehicle are evaluated for finding suitable communication partners with regard to a possible selective communication with a selected communication partner transmitting one of the identification signals received, the identification signals being evaluated taking into consideration the information item, and
a frequency different from the predetermined transmission frequency is used for the selective communication with the selected communication partner,
wherein when the receiver receives a plurality of identification signals from different communication partners during a single transmission break on the predetermined transmission frequency, the communication device performs a filtering operation to resolve overlapping identification signals received during the single transmission break from the different communication partners.

* * * * *